(12) United States Patent
Shimizu

(10) Patent No.: US 10,946,523 B2
(45) Date of Patent: Mar. 16, 2021

(54) FAILURE DIAGNOSTIC DEVICE AND FAILURE DIAGNOSTIC METHOD

(71) Applicant: NISSAN MOTOR CO., LTD., Kanagawa (JP)

(72) Inventor: Toshiyuki Shimizu, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 539 days.

(21) Appl. No.: 15/575,569

(22) PCT Filed: May 20, 2015

(86) PCT No.: PCT/JP2015/064505
§ 371 (c)(1),
(2) Date: Nov. 20, 2017

(87) PCT Pub. No.: WO2016/185589
PCT Pub. Date: Nov. 24, 2016

(65) Prior Publication Data
US 2018/0133897 A1    May 17, 2018

(51) Int. Cl.
*B25J 9/16* (2006.01)
*B25J 19/06* (2006.01)
(Continued)

(52) U.S. Cl.
CPC .......... *B25J 9/1674* (2013.01); *B25J 9/1676* (2013.01); *B25J 13/085* (2013.01); *B25J 19/06* (2013.01);
(Continued)

(58) Field of Classification Search
CPC .......... G05B 2219/39355; B25J 9/1674; B25J 9/1676
See application file for complete search history.

(56) References Cited

U.S. PATENT DOCUMENTS 5,418,440 A    5/1995  Sakaguchi et al.
6,527,534 B1 *  3/2003  Kamiguchi ......... B29C 45/7626
                                              425/139
(Continued)

FOREIGN PATENT DOCUMENTS

JP    H09-174482 A    7/1997
JP    H11-282540 A    10/1999
(Continued)

*Primary Examiner* — Michael J Dalbo
(74) *Attorney, Agent, or Firm* — Osha Bergman Watanabe & Burton LLP

(57) ABSTRACT

A failure diagnostic device includes a torque detector that detects disturbance torques applied to joint shafts included in a multi-axis robot, a torque grouping circuit that groups the disturbance torques according to a content of an operation executed by the multi-axis robot upon detection of each disturbance torque, a torque correction circuit that obtains a corrected disturbance torque standardized between a plurality of operations with different contents based on a representative value preliminarily set for each grouped disturbance torque and the disturbance torque detected by the torque detector, and a failure diagnostic circuit that performs a failure diagnosis on the multi-axis robot by comparing the corrected disturbance torque with a threshold.

11 Claims, 7 Drawing Sheets

(51) Int. Cl.
*B25J 13/08* (2006.01)
*G01L 5/00* (2006.01)
*G01L 5/16* (2020.01)

(52) U.S. Cl.
CPC .............. *G01L 5/0076* (2013.01); *G01L 5/16* (2013.01); *G05B 2219/37214* (2013.01); *G05B 2219/37344* (2013.01); *G05B 2219/39355* (2013.01); *G05B 2219/39412* (2013.01); *G05B 2219/41372* (2013.01)

(56) References Cited

U.S. PATENT DOCUMENTS

| | | | | |
|---|---|---|---|---|
| 6,812,943 | B1 * | 11/2004 | Day | B41J 2/325 347/171 |
| 2007/0067678 | A1 * | 3/2007 | Hosek | G05B 23/0235 714/25 |
| 2009/0088625 | A1 * | 4/2009 | Oosting | A61N 7/02 600/411 |
| 2010/0036526 | A1 * | 2/2010 | Eriksson | B25J 9/161 700/250 |
| 2011/0066265 | A1 * | 3/2011 | Gagliano | F16F 15/02 700/95 |

FOREIGN PATENT DOCUMENTS

| | | | |
|---|---|---|---|
| JP | H11-291190 A | | 10/1999 |
| JP | H11282540 A | * | 10/1999 |
| JP | 2008-183680 A | | 8/2008 |

\* cited by examiner

FAILURE DIAGNOSTIC DEVICE AND FAILURE DIAGNOSTIC METHOD

BACKGROUND

Technical Field

The present invention relates to a failure diagnostic device for and a failure diagnostic method of performing a failure diagnosis on a multi-axis robot.

Related Art

Patent Literature 1 has been disclosed as a conventional failure diagnostic method for an articulated industrial robot. In the failure diagnostic method disclosed in Patent Literature 1, while a robot is in operation, the movement position of each joint shaft of the robot and the disturbance torque applied to the joint shaft are detected at predetermined intervals, and the average of the disturbance torque at each detected movement position is calculated. Then, this average and a preset threshold are compared and, if the average is greater than the preset threshold, it is determined that the robot is experiencing an abnormality or failure.

Patent Literature 1: Japanese Patent Application Publication No. H 9-174482

SUMMARY OF INVENTION

However, the disturbance torque can differ depending on the contents of the operation executed by the robot. The method disclosed in Patent Literature 1 may result in a wrong decision on the failure diagnosis because the method compares the preset threshold with the disturbance torque without taking the contents of the operation into consideration.

A failure diagnostic device and a failure diagnostic method according to one or more embodiments of the present invention is capable of performing an accurate failure diagnosis while taking contents of operations executed by a robot into consideration.

A failure diagnostic device and a failure diagnostic method according to one or more embodiments of the present invention groups disturbance torques applied to joint shafts included in a multi-axis robot according to contents of operations executed by the multi-axis robot upon detection of the disturbance torques. A failure diagnosis is performed on the multi-axis robot by comparing each grouped disturbance torque with a threshold.

DETAILED DESCRIPTION

Figure 1:
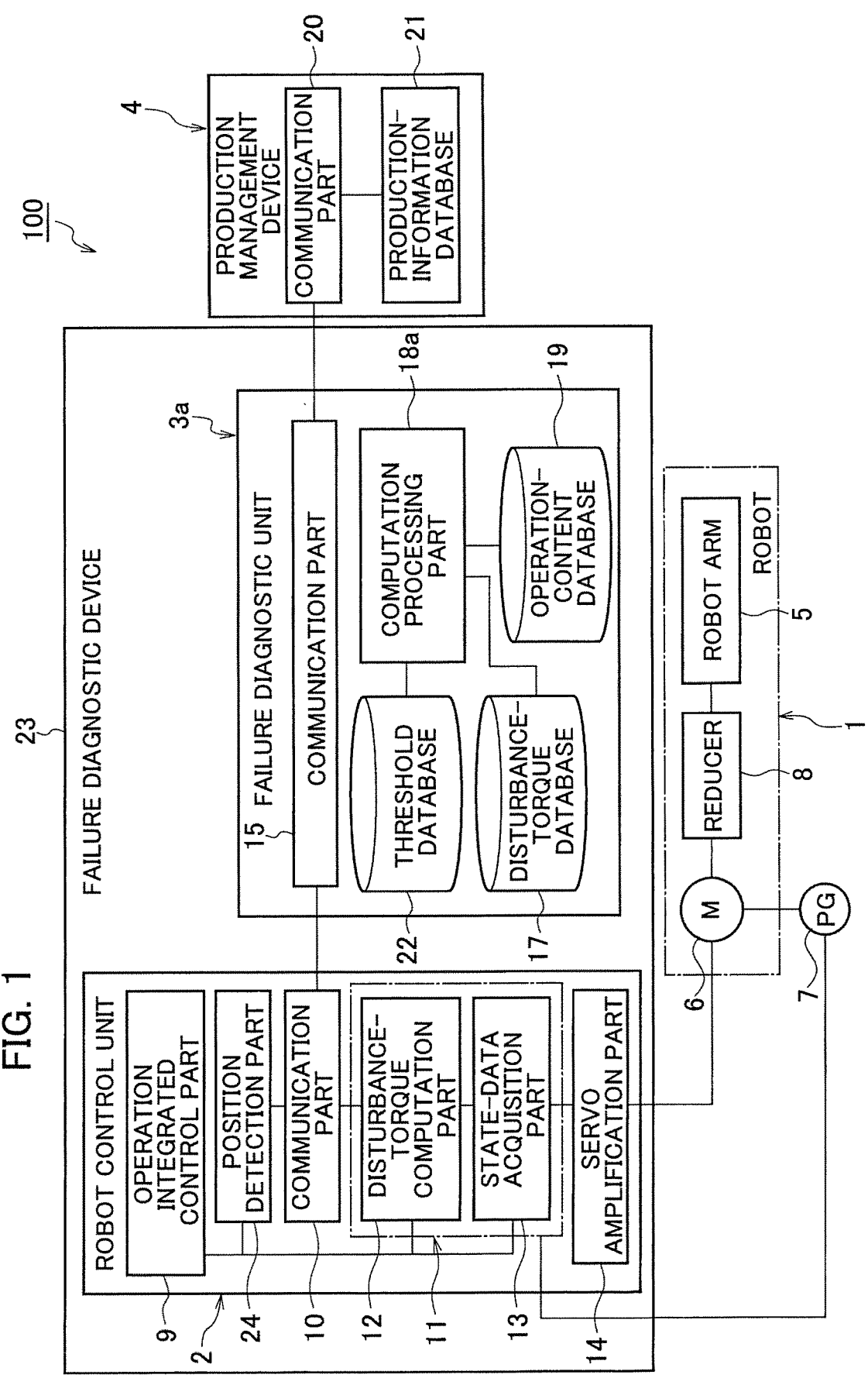
FIG. 1 is a block diagram illustrating the overall configuration of a failure diagnostic system 100 including a failure diagnostic device 23 according to a first embodiment.

Some embodiments will now be described in detail below with reference to the drawings. Similar portions illustrated in the drawings will be denoted by identical reference signs, and description thereof will be omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

The overall configuration of a failure diagnostic system 100 including a failure diagnostic device 23 according to a first embodiment will be described with reference to FIG. 1. The failure diagnostic system 100 is formed of a robot 1, a failure diagnostic device 23, and a production management device 4. The failure diagnostic device 23 includes a robot control unit 2 and a failure diagnostic unit 3a.

The robot 1 is a multi-axis-machine teaching-playback robot as an example of a multi-axis robot. The robot 1 includes motor drive systems as joint shafts being operation shafts. The robot arm 5 is driven by a servomotor (hereinafter simply referred to as the motor) 6 through a reducer 8. To the motor 6 is attached a pulse coder (pulse generator or encoder) 7 being a component for detecting its rotational angle position and speed.

The robot control unit 2 includes an operation integrated control part 9, a position detection part 24, a communication part 10, a servo control part 11 (an example of a torque detection part), and a servo amplification part 14. The servo control part 11 drives the motor 6 through the servo amplification part 14 upon receipt of a command from the higher-level operation integrated control part 9. The pulse coder 7, attached to the motor 6, forms a feedback loop for a process of controlling the rotational angle position and speed of the motor 6 between itself and the servo control part 11.

The servo control part 11 includes a processor that performs a process of controlling the rotational angle position, speed, and current of the motor 6, an ROM that stores a control program, and a non-volatile storage that stores preset values and various parameters. The servo control part 11 also includes an RAM that temporarily stores data during a computation process, a register that counts position feedback pulses from the pulse coder 7 to detect the absolute rotational angle position of the motor 6, and so on.

The servo control part 11 forms circuitry that detects disturbance torques (Tq) applied to the joint shafts by causing the processor to execute a pre-installed computer program. The servo control part 11 includes a disturbance-torque computation part 12 and a state-data acquisition part 13 as the above circuitry.

The state-data acquisition part 13 regularly collects various data on the state of actuation of each joint shaft of the robot 1 (data indicating the rotational angle position, the speed, and the current). The disturbance-torque computation part 12 computes the disturbance torque (Tq) based on the data acquired by the state-data acquisition part 13. The data indicating the rotational angle position, the speed and the current, and the disturbance torque (Tq) are outputted to the failure diagnostic unit 3a through the communication part 10. With this configuration, the servo control part 11 is in the form of what is called a software servo. Details of a method of calculating the disturbance torque (Tq) will be described below with reference to FIG. 2. The disturbance torque (Tq) refers to the difference between a torque command value for the motor 6 and the torque generated by the motor 6.

Note that motor drive systems as the one in FIG. 1 are required as many as the joint shafts included in the robot 1. However, in FIG. 1, only the motor drive system for one shaft is illustrated, and illustration of the other motor drive systems is omitted. Also, a speed-change gear train is interposed between the motor 6 and the reducer 8 in FIG. 1 in some cases.

The position detection part 24 detects the movement position of the joint shaft provided with the motor 6 from the absolute rotational angle position of the motor 6 acquired by the state-data acquisition part 13. Data indicating the movement position of the joint shaft, detected by the position detection part 24, is outputted to the failure diagnostic unit 3a through the communication part 10 in association with data indicating the disturbance torque (Tq). The information on the movement position of the joint shaft and the disturbance torque, which are associated with each other, is transferred to the failure diagnostic unit 3a.

Situated in a higher level than the servo control part 11 and the position detection part 24, the operation integrated control part 9 has direct control of the operation of the robot 1. The communication part 10 exchanges necessary data with a communication part 15 of the failure diagnostic unit 3a to be described below through a LAN or the like.

The failure diagnostic unit 3a includes the communication part 15, a threshold database 22, a disturbance-torque database 17, a computation processing part 18a, and an operation-content database 19. The communication part 15 exchanges necessary data with the communication part 10 of the above-described robot control unit 2 and a communication part 20 of the production management device 4 through LANs or the like.

The disturbance-torque database 17 sequentially stores pieces of the data indicating the disturbance torques (Tq) associated with the movement positions of the joint shafts, which are transmitted from the robot control unit 2. Past disturbance torques (Tq) are accumulated in the disturbance-torque database 17.

The computation processing part 18a actively executes a failure diagnosis on the robot 1 based on the disturbance torques (Tq) stored in the disturbance-torque database 17. The computation processing part 18a is equipped with a memory function, and temporarily stores data acquired by accessing the disturbance-torque database 17 and executes a failure diagnosis based on these data. Details of the computation processing part 18a will be described below with reference to FIG. 3.

The production management device 4 is a device that manages production information including, for example, the operational situations of production lines in a factory, and includes the communication part 20 and a production-information database 21. The communication part 20 exchanges necessary data with the communication part 15 of the failure diagnostic unit 3a through a LAN or the like. The production-information database 21 has a function of storing various pieces of production information collected. Thus, various previous pieces of production information are accumulated in the production-information database 21. The communication part 20 transmits the production information accumulated in the production-information database 21 to the communication part 15 in response to a request made by the failure diagnostic unit 3a.

The production information includes a timetable for contents of operations executed by the robot 1. Once the date and time and the robot 1 for executing operations are fixed, the contents of the operations being executed by the robot 1 can be specified. In a case where the robot 1 is installed in a vehicle production line, the contents of the operations include information about, for example, the type of vehicle related to each operation, the presence or absence and contents of options set for each vehicle related to the operation, and process that the operation follows. The process that the operation follows includes a step of pressing, a step of welding a vehicle body, a step of coating, a step of resin molding, and a step of assembly.

The timetable for the contents of the operations collected from the production management device 4 is stored in the operation-content database 19. Various kinds of data on the state of actuation of each joint shaft of the robot 1, obtained by the state-data acquisition part 13, are also stored in the operation-content database 19 through the communication with the robot control unit 2.

The failure diagnostic unit 3a according to the first embodiment includes the threshold database 22. Thresholds for a failure diagnosis preset according to the contents of the operations are preliminarily stored in the threshold database 22. Details thereof will be described below with reference to FIGS. 4(a)-4(b).

Figure 2:
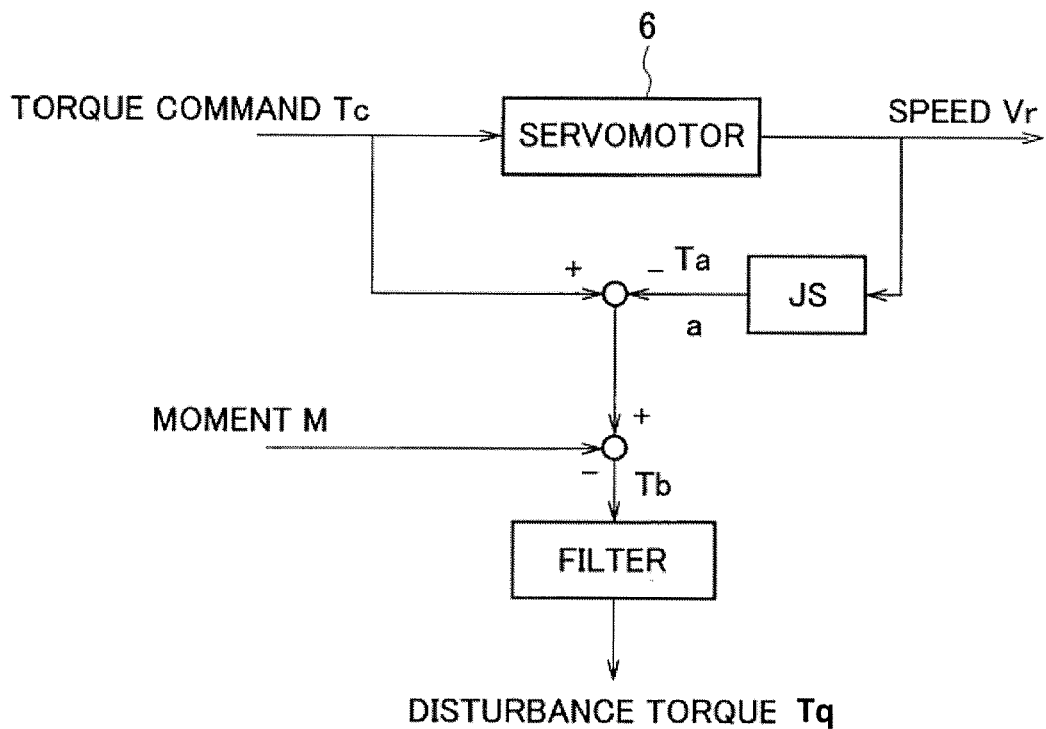
FIG. 2 is a block diagram illustrating a method of calculating a disturbance torque (Tq).

An example of the method of calculating a disturbance torque (Tq) will be described with reference to FIG. 2. The disturbance-torque computation part 12 differentiates an actual speed Vr of the motor 6 calculated from a speed feedback signal from the pulse coder 7 to calculate the acceleration. The disturbance-torque computation part 12 multiplies this acceleration by all inertias J applied to the motor 6 to calculate an acceleration torque Ta. Then, the disturbance-torque computation part 12 subtracts the acceleration torque Ta from a torque command Tc for the motor 6 calculated with a speed loop process by the servo control part 11. From the value resulting from the subtraction, a moment M is further subtracted to calculate a disturbance torque Tb. Thereafter, a predetermined filtering process is performed to remove disturbance irregular components to obtain a "disturbance torque (Tq)". By causing the servo control part 11 to execute such processing at predetermined sampling intervals, disturbance torques (Tq) can be sequentially detected.

More specifically, the servo control part 11 includes a register, and this register finds the absolute position of the motor 6 by counting position feedback pulses from the pulse coder 7 at predetermined sampling intervals. Thus, the servo control part 11 detects the absolute position of the motor 6 by means of the register and, from the absolute position of the motor 6, finds the rotational angle position (movement position) of the joint shaft driven by the motor 6. Further, the servo control part 11 performs the processing in FIG. 2 as described above to calculate the disturbance torque (Tq).

Figure 3:
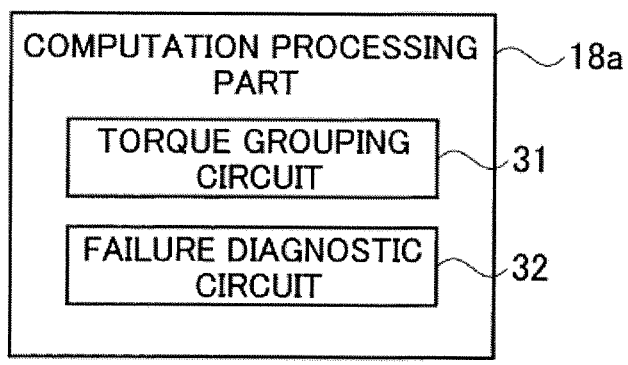
FIG. 3 is a block diagram illustrating a specific configuration of a computation processing part 18a in FIG. 1.

Details of the computation processing part 18a will be described with reference to FIG. 3. The computation processing part 18a includes a microprocessor and forms a series of computation processing circuits for performing a failure diagnosis on the robot 1 based on its disturbance torques by executing a pre-installed program. The computation processing part 18a includes a torque grouping circuit 31 and a failure diagnostic circuit 32 as the series of computation processing circuits.

The torque grouping circuit 31 groups the disturbance torques (Tq) according to the contents of the operations executed by the robot 1 upon detection of the disturbance torques (Tq). The failure diagnostic circuit 32 performs a failure diagnosis on the robot 1 by comparing each grouped disturbance torque (Tq) and a threshold ($\alpha$).

The torque grouping circuit 31 can group the disturbance torques (Tq) according to the type of vehicle related to each operation, as an example of the contents of the operations. The information on the type of vehicle related to each operation may be obtained from the timetable for the contents of the operations stored in the operation-content database 19.

The torque grouping circuit 31 can group the disturbance torques (Tq) according to the process that each operation follows, as another example of the contents of the operations. The information on the process that each operation follows may be obtained from the timetable for the contents of the operations stored in the operation-content database 19.

The torque grouping circuit 31 can group the disturbance torques (Tq) according to the distance that the respective joint shafts of the robot 1 move when executing each operation, as yet another example of the contents of the operations. The information on the distance of movement of the joint shafts may be computed according to various data on the state of actuation of each joint shaft of the robot 1 obtained by the state-data acquisition part 13.

The torque grouping circuit 31 can group the disturbance torques (Tq) according to the amount of current applied to the motor 6 when driving the joint shaft of the robot 1 during each operation, as still yet another example of the contents of the operations. The information on the amount of current applied to the motor 6 may be computed according to various data on the state of actuation of each joint shaft of the robot 1 obtained by the state-data acquisition part 13.

Figure 4:
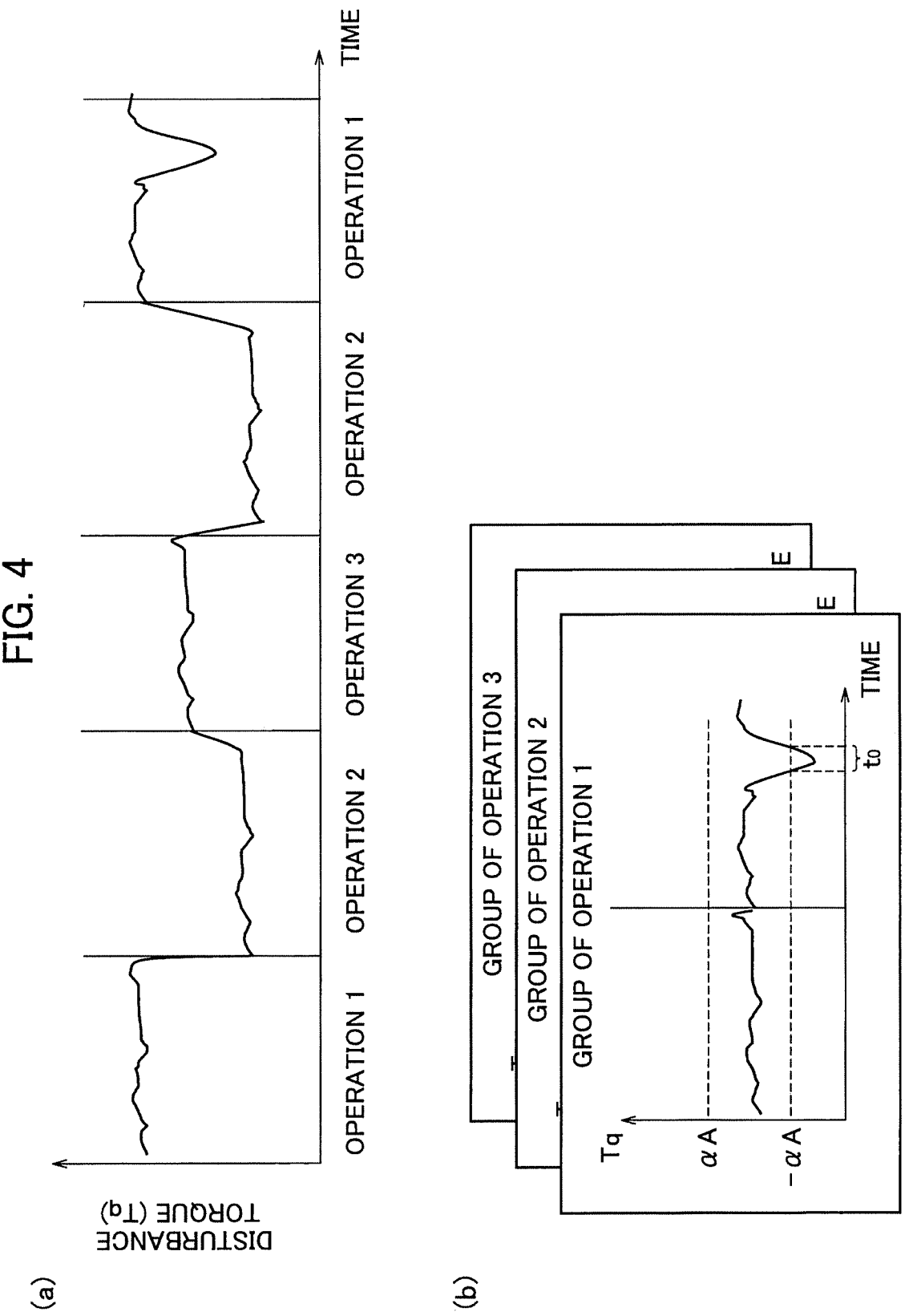
FIG. 4(a) is a graph illustrating a result of detected disturbance torques (Tq) categorized according to the contents of operations executed by a robot 1.
FIG. 4(b) is a view illustrating the disturbance torques (Tq) grouped into categorized operations.

FIG. 4(a) is a graph illustrating the disturbance torques (Tq) detected by the servo control part 11 and categorized according to the contents of the operations executed by the robot 1 upon the detection of the disturbance torques (Tq). FIG. 4(b) illustrates the disturbance torques (Tq) grouped into the categorized operations. The horizontal axis shows time, and the vertical axis shows disturbance torque (Tq). The disturbance torques (Tq) are grouped into operation 1, operation 2, and operation 3. Although FIG. 4(b) only illustrates the group of operation 1, the same grouping as operation 1 is applied to operation 2 and operation 3.

As shown in FIG. 4(a), the disturbance torques (Tq) may greatly vary depending on the contents of the operations executed by the robot 1 upon the detection of the disturbance torques (Tq). In particular, examples of vehicles manufactured in production lines include vehicles of different types such as compact vehicles and large-sized vehicles, and vehicles of the same type manufactured in different processes due to the presence or absence of options (mixed production system). The contents of the operations actually executed by the same robot 1 differ among the production conditions. Thus, parameters for a failure diagnosis (the disturbance torques (Tq)) to be detected may vary depending on the contents of the operations. This may lead to a wrong failure diagnosis if the failure diagnosis is carried out by use of a fixed threshold regardless of the contents of the operations.

The failure diagnostic circuit 32 thus performs a failure diagnosis on the robot 1 by comparing a threshold preliminarily set for each grouped disturbance torque (Tq) and the corresponding disturbance torque (Tq). For example, a threshold ($+\alpha A$, $-\alpha A$) is preliminarily set for operation 1, as shown in FIG. 4(b). Similarly, a threshold ($+\alpha B$, $-\alpha B$) and a threshold ($+\alpha C$, $-\alpha C$) are preliminarily set for operation 2 and operation 3, respectively. The data of the thresholds ($+\alpha A$, $-\alpha A$, $+\alpha B$, $-\alpha B$, $+\alpha C$, and $-\alpha C$) is preliminarily set in the threshold database 22. The failure diagnostic circuit 32 reads the thresholds from the threshold database 22. The failure diagnostic circuit 32 compares the disturbance torque (Tq) and the preset threshold ($\alpha$) in each categorized group. As shown in FIG. 4(b), the absolute value of the disturbance torque (Tq) exceeds the threshold ($\alpha A$) at the time ($t_0$), so that the failure diagnostic circuit 32 determines that the robot 1 is experiencing a failure in operation 1. Since the threshold ($\alpha$) is preliminarily set for each categorized group, an appropriate threshold can be allotted to the absolute value of the disturbance torque (Tq) that varies depending on the contents of the operations.

A failure diagnostic method according to the first embodiment will be described with reference to a flowchart in FIG. 5. The failure diagnostic method according to the first embodiment is executed using the failure diagnostic device 23 in FIG. 1. In step S01, the state-data acquisition part 13 collects various data on the state of actuation of each joint shaft of the robot 1 (data indicating the rotational angle position, the speed, and the current), and the disturbance-torque computation part 12 computes the disturbance torques (Tq) based on the data acquired by the state-data acquisition part 13. The disturbance torques (Tq), computed by the disturbance-torque computation part 12, are linked to the movement positions of the joint shafts and outputted to the failure diagnostic unit 3a through the communication part 10.

In step S03, the torque grouping circuit 31 groups the disturbance torques (Tq) according to the contents of the operations executed by the robot 1 upon the detection of the disturbance torques (Tq). For example, when the robot 1 is operated in a vehicle production line, the torque grouping circuit 31 groups the disturbance torques (Tq) according to the type of vehicle related to each operation executed by the robot 1, the process that the operation follows, the movable range of the robot arm 5 in the operation, the current applied to the motor 6 during the operation, or combinations of these contents. The following is the case where the disturbance torques (Tq) are grouped into operation 1, operation 2, and operation 3, in the same manner as illustrated in FIGS. 4(a)-4(b). The torque grouping circuit 31 refers to the timetable for the contents of the operations stored in the operation-content database 19, so as to acquire the data indicating the type of vehicle, the process that the operation follows, the movable range of the robot arm 5, or the current applied to the motor 6.

In step S05, S07, and S09, the failure diagnostic circuit 32 reads a threshold ($\alpha_1$, $\alpha_2$, $\alpha_3$) set for each categorized operation from the threshold database 22. In particular, as illustrated in FIGS. 4(a)-4(b), the failure diagnostic circuit 32 sets the threshold ($+\alpha A$, $-\alpha A$), the threshold ($+\alpha B$, $-\alpha B$), and threshold ($+\alpha C$, $-\alpha C$) for operation 1, operation 2, and operation 3, respectively.

In step S11, S13, and S15, the failure diagnostic circuit 32 compares each grouped disturbance torque (Tq) with the threshold ($\alpha_1$, $\alpha_2$, $\alpha_3$) set for each categorized operation. When the disturbance torque (Tq) is greater than the threshold ($\alpha_1$, $\alpha_2$, $\alpha_3$), the failure diagnostic circuit 32 determines that the robot 1 is experiencing a failure (S17, S21, S25). When the disturbance torque (Tq) is less than or equal to the threshold ($\alpha_1$, $\alpha_2$, $\alpha_3$), the failure diagnostic circuit 32 determines that the robot 1 is not experiencing any failure (S19, S23, S27). The flowchart in FIG. 5 is implemented as above regularly to perform a failure diagnosis.

As described above, the first embodiment may bring about one or more of the following advantageous effects.

In the case where the same robot 1 executes a plurality of operations with different contents (such as vehicle types and processes), the disturbance torques (Tq) applied to the joint shafts of the robot 1 may vary depending on the contents of the operations. A failure diagnosis on the robot 1 is therefore performed such that the disturbance torques (Tq) are grouped according to the contents of the operations, and each grouped disturbance torque (Tq) is compared with a threshold. Accordingly, an accurate failure diagnosis can be performed while taking the disturbance torques (Tq) varying depending on the contents of the operations into consideration.

The torque grouping circuit 31 may group the disturbance torques (Tq) according to the type of vehicle related to each operation executed by the robot 1. An accurate failure diagnosis thus can be performed regardless of the disturbance torques (Tq) varying depending on the type of vehicle.

The torque grouping circuit 31 may group the disturbance torques (Tq) according to the process that each operation executed by the robot 1 follows. An accurate failure diagnosis thus can be performed regardless of the disturbance torques (Tq) varying depending on the process that the operation follows.

The torque grouping circuit 31 may group the disturbance torques (Tq) according to the distance that the respective joint shafts of the robot 1 move when executing each operation. An accurate failure diagnosis thus can be performed regardless of the disturbance torques (Tq) varying depending on the distance that the joint shafts move.

The torque grouping circuit 31 may group the disturbance torques (Tq) according to the amount of current applied to the motor 6 when driving the joint shaft of the robot 1 during each operation. An accurate failure diagnosis thus can be performed regardless of the disturbance torques (Tq) varying depending on the amount of current applied to the motor 6.

The disturbance torques (Tq) may be grouped independently according to the type of vehicle, the process that each operation follows, the distance that the joint shafts move, and the amount of current applied to the motor 6. The disturbance torques (Tq) may be grouped into more specific categories according to an optional combination of these contents. The optional combination of the contents allows a more detail threshold setup, so as to perform a failure diagnosis more accurately.

The failure diagnostic circuit 32 performs a failure diagnosis on the robot 1 by comparing the threshold ($\alpha_1$, $\alpha_2$, $\alpha_3$) preliminarily set for each of the grouped disturbance torques (Tq) and the corresponding disturbance torque (Tq). Since the threshold ($\alpha_1$, $\alpha_2$, $\alpha_3$) is preliminarily set for each category, an appropriate threshold can be allotted to the absolute value of the respective disturbance torques (Tq) varying depending on the contents of the operations.

Second Embodiment

The first embodiment exemplified the case where, when the same robot executes a plurality of operations with different contents (such as vehicle types and processes), a threshold is set for each of the operations. However, the present invention is not limited thereto, and a failure diagnosis on the robot 1 may be performed with a fixed threshold regardless of the contents of the operations in a case where disturbance torques (Tq) can be standardized between the plural operations executed by the same robot. A second embodiment is illustrated with a case where disturbance torques (Tq) generated in a plurality of operations are subjected to standardization processing when the same robot executes the plural operations with different contents (such as vehicle types and processes).

Figure 6:
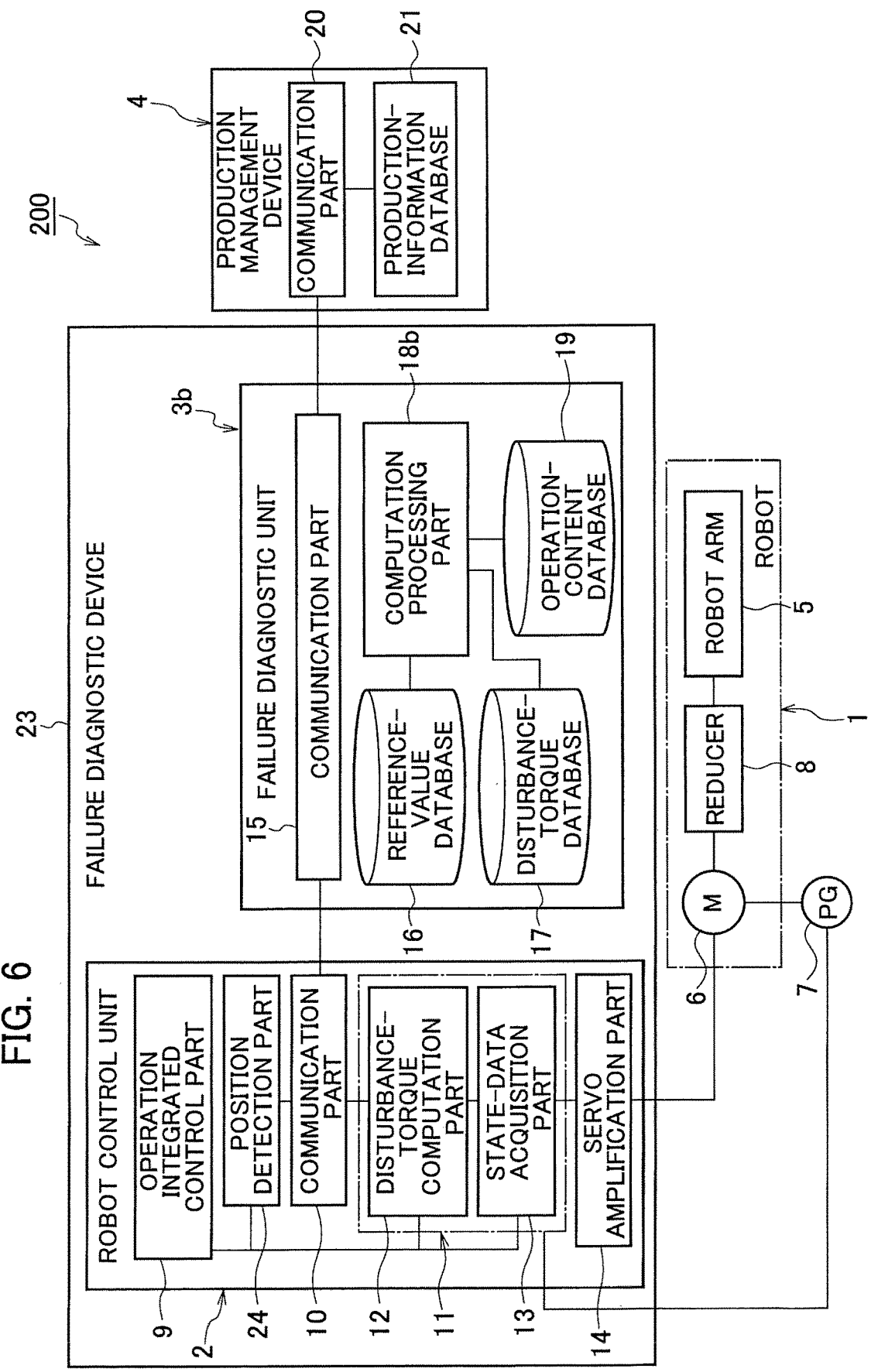
FIG. 6 is a block diagram illustrating the overall configuration of a failure diagnostic system 200 including a failure diagnostic device 23 according to a second embodiment.

The overall configuration of a failure diagnostic system 200 including a failure diagnostic device 23 according to the second embodiment will be described with reference to FIG. 6.

The failure diagnostic system 200 differs from FIG. 1 in that its failure diagnostic unit 3b further includes a reference-value database 16 for storing disturbance-torque reference values, instead of the threshold database 22, and that its computation processing part 18b has a different circuit configuration. Beside these, the failure diagnostic system 200 is identical to FIG. 1. The disturbance-torque reference values are reference values used for standardization processing for disturbance torques (Tq). The disturbance-torque reference values are set for each of the grouped disturbance torques. For example, the disturbance-torque reference values are a combination of a representative value of a disturbance torque (Tq) and an amount of change in the disturbance torque (Tq). The representative value of the disturbance torque (Tq) can be the average, median, or integral of the disturbance torque (Tq) detected during the corresponding operation executed by the robot 1. The amount of change in the disturbance torque (Tq) can be the variance, deviation, standard deviation, or difference between the largest value and the smallest value of the disturbance torque (Tq) detected during the operation executed by the robot 1. The present embodiment is illustrated with a case where the representative value is the average of the disturbance torque (Tq) and the amount of change is the standard deviation of the disturbance torque (Tq).

Figure 7:
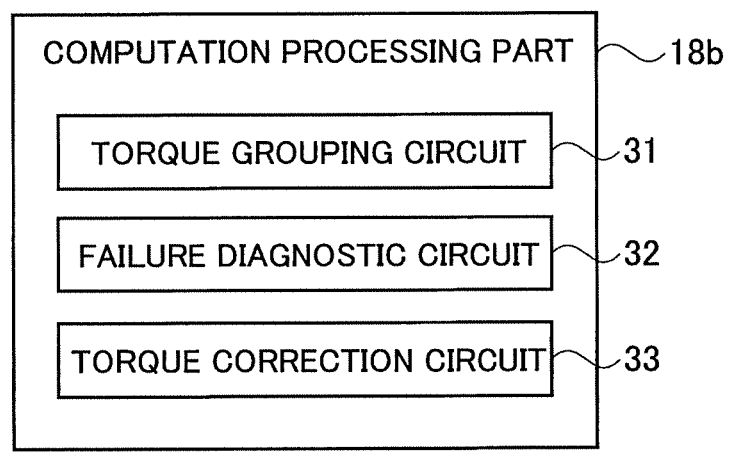
FIG. 7 is a block diagram illustrating a specific configuration of a computation processing part 18b in FIG. 6.

Details of the computation processing part 18b will be described with reference to FIG. 7. The computation processing part 18b includes a microprocessor and forms a series of computation processing circuits for performing a failure diagnosis on the robot 1 based on its disturbance torques by executing a pre-installed program. The computation processing part 18b includes a torque grouping circuit 31, a failure diagnostic circuit 32, and a torque correction circuit 33, as the series of computation processing circuits. The computation processing part 18b differs from the computation processing part 18a in FIG. 3 in further including the torque correction circuit 33.

The torque correction circuit 33 corrects a disturbance torque (Tq) by using the disturbance-torque reference values stored in the reference-value database 16. The correction is performed on each categorized operation. The entire grouped disturbance torque (Tq) is subjected to correction. The reference values used for the correction are preliminarily set for each categorized operation. The disturbance torque (Tq) thus corrected will be referred to as a corrected disturbance torque (Tq'). In particular, the torque correction circuit 33 acquires a corrected disturbance torque (Tq') by subtracting the representative value from the disturbance torque (Tq) detected during the execution of the operation and dividing the value resulting from the subtraction by the amount of change. The torque correction circuit 33 carries out this calculation per categorized operation. Thus, the torque correction circuit 33 can acquire the corrected disturbance torque (Tq') standardized between a plurality of operations with different contents executed by the same robot 1.

The failure diagnostic circuit 32 performs a failure diagnosis on the robot 1 by comparing the corrected disturbance torque (Tq') obtained by the torque correction circuit 33 with a single threshold ($\alpha$). Specifically, the failure diagnostic circuit 32 can determine that the robot 1 is experiencing a failure if the absolute value of the corrected disturbance torque (Tq') is greater than the threshold ($\alpha$). In the second embodiment, the threshold ($\alpha$) is a value unique to the robot 1, and is a value fixed regardless of which content of an operation (group) is executed by the robot 1. Since the corrected disturbance torque (Tq') is a value standardized between a plurality of operations, the threshold ($\alpha$) does not vary from one operation to another.

Figure 8:
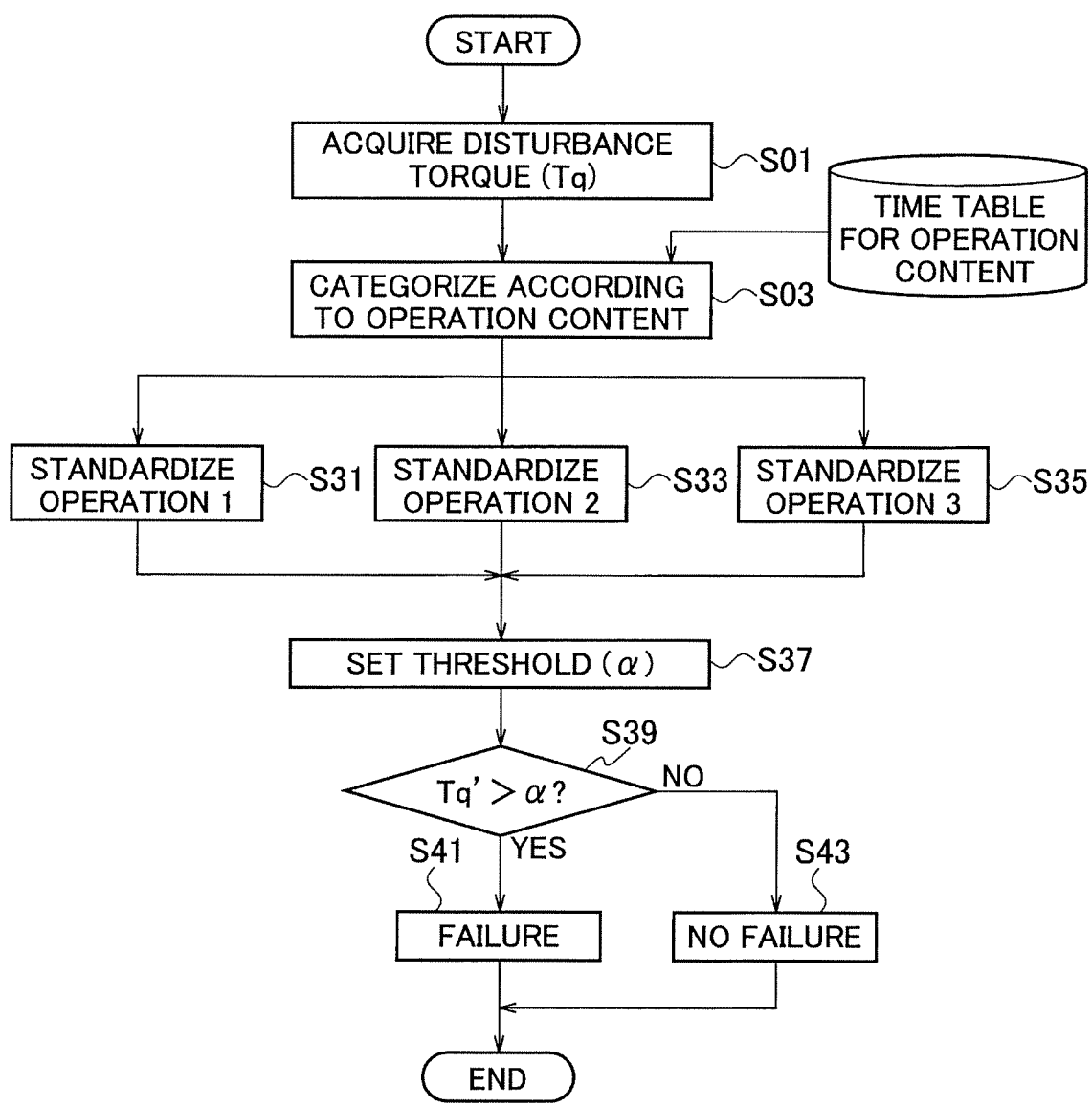
FIG. 8 is a flowchart illustrating a failure diagnostic method according to the second embodiment.

A failure diagnostic method according to the second embodiment will be described with reference to a flowchart in FIG. 8. The failure diagnostic method according to the second embodiment is executed using the failure diagnostic device 23 in FIG. 6.

Figure 5:
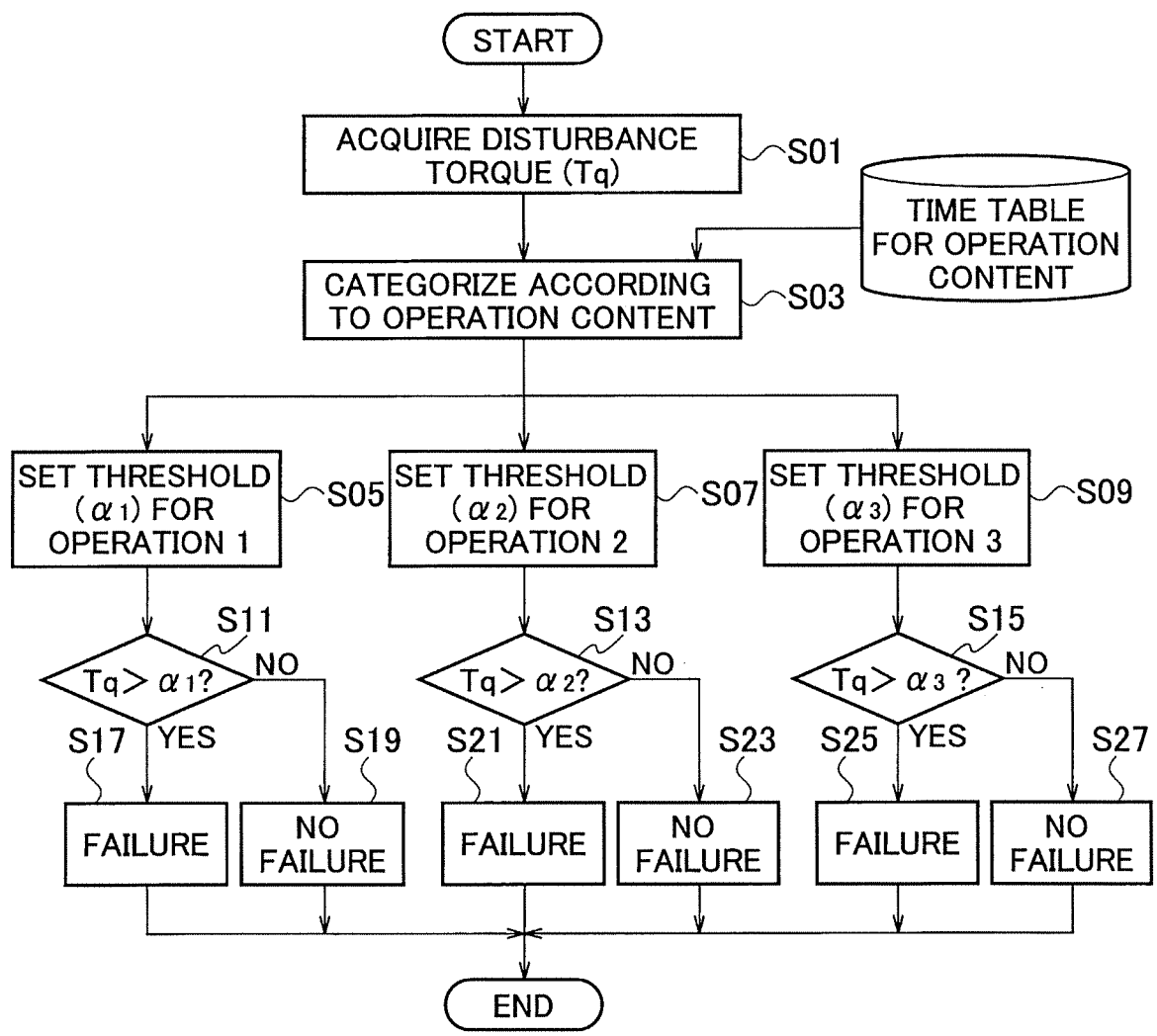
FIG. 5 is a flowchart illustrating a failure diagnostic method according to the first embodiment.

Steps S01 and S03 are the same as those in FIG. 5, and explanations thereof are omitted. In steps S31, S33, and S35, the torque correction circuit 33 executes standardizing processing for a disturbance torque (Tq) in each categorized group. In particular, the torque correction circuit 33 reads, from the reference-value database 16, the disturbance-torque reference values (the representative value and the amount of change) preliminarily set for each categorized group. The torque correction circuit 33 subtracts the representative value of the disturbance torque (Tq) from the disturbance torque (Tq), and divides the value resulting from the subtraction by the amount of change of the disturbance torque (Tq). Thus, the torque correction circuit 33 can acquire a corrected disturbance torque (Tq') for each of categorized operation 1, operation 2, and operation 3.

In the following step S37, the failure diagnostic circuit 32 reads a single threshold ($\alpha$) common to the categorized operations from memory in a microcontroller. The threshold ($\alpha$) can be shared by categorized operation 1, operation 2 and operation 3 so as to be used for each corrected disturbance torque (Tq').

In the following step S39, the respective corrected disturbance torques (Tq') in categorized operation 1, operation 2, and operation 3 are compared with the single threshold ($\alpha$). When one of the corrected disturbance torques (Tq') is greater than the threshold ($\alpha$) (YES in step S39), the robot 1 can be considered as being experiencing a failure (step S41). When the corrected disturbance torques (Tq') are all less than or equal to the threshold ($\alpha$) (NO in step S39), the robot 1 can be considered as not being experiencing any failure (step S43). The flowchart in FIG. 8 is implemented as above regularly to perform a failure diagnosis.

As described above, the second embodiment may bring about one or more of the following advantageous effects.

The torque correction circuit 33 corrects each grouped disturbance torque (Tq) to obtain a corrected disturbance torque (Tq'). The failure diagnostic circuit 32 performs a failure diagnosis on the robot 1 by comparing the corrected disturbance torque (Tq') with the threshold ($\alpha$). Accordingly, a failure diagnosis can be performed with the fixed threshold ($\alpha$) regardless of the contents of the operations due to the correction performed on the disturbance torque (Tq) of each group. In other words, it is no longer necessary to set a different threshold for each operation.

Although embodiments of the present invention have been described above, it should not be understood that the statements and the drawings constituting part of this disclosure limit this invention. Various alternative embodiments, examples, and operation techniques will become apparent to those skilled in the art from this disclosure. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 robot
2 robot control unit
3a, 3b failure diagnostic unit
6 motor
11 servo control part (torque detection part)
16 reference-value database
17 disturbance-torque database
18a, 18b computation processing part
19 operation-content database
22 threshold database
23 failure diagnostic device
24 position detection part
31 torque grouping circuit
32 failure diagnostic circuit
33 torque correction circuit
Tq disturbance torque
Tq' corrected disturbance torque
$\alpha$ threshold

The invention claimed is:

1. A failure diagnostic device comprising:
a torque detector that detects disturbance torques applied to joint shafts included in a multi-axis robot;
a torque grouping circuit that groups the disturbance torques according to a content of an operation executed by the multi-axis robot upon detection of each disturbance torque;
a torque correction circuit that obtains, for each group of disturbance torques, a corrected disturbance torque by standardizing the disturbance torques detected by the torque detector based on a representative value calculated from the disturbance torques detected during the operation executed by the multi-axis robot for each grouped disturbance torque; and
a failure diagnostic circuit that performs a failure diagnosis on the multi-axis robot by comparing each of the corrected disturbance torques obtained for a plurality of operations with different contents with a common threshold regardless of the contents of the operations.

2. The failure diagnostic device according to claim 1, wherein the torque grouping circuit groups the disturbance torques according to a type of a vehicle related to the operation executed by the multi-axis robot.

3. The failure diagnostic device according to claim 1, wherein the torque grouping circuit groups the disturbance torques according to a process that the operation executed by the multi-axis robot follows.

4. The failure diagnostic device according to claim 1, wherein the torque grouping circuit groups the disturbance torques according to a distance that each joint shaft moves in the operation executed by the multi-axis robot.

5. The failure diagnostic device according to claim 1, wherein the torque grouping circuit groups the disturbance torques according to an amount of current applied to a motor that drives each joint shaft in the operation executed by the multi-axis robot.

6. A failure diagnostic method comprising:
  detecting disturbance torques applied to joint shafts included in a multi-axis robot;
  grouping the disturbance torques according to a content of an operation executed by the multi-axis robot upon detection of each disturbance torque;
  obtaining, for each group of disturbance torques, a corrected disturbance torque by standardizing the disturbance torques based on a representative value calculated by the disturbance torques detected during the operation executed from the multi-axis robot for each grouped disturbance torque; and
  performing a failure diagnosis on the multi-axis robot by comparing each of the corrected disturbance torques obtained for a plurality of operations with different contents with a common threshold regardless of the contents of the operations.

7. The failure diagnostic device according to claim 1, wherein the torque correction circuit standardizes each disturbance torque based on the representative value and an amount of change preliminarily set for each grouped disturbance torque.

8. The failure diagnostic device according to claim 7, wherein the torque correction circuit standardizes each disturbance torque by subtracting the representative value from the disturbance torque, and dividing a result of the subtraction by the amount of change of the disturbance torque.

9. A failure diagnostic device comprising:
  a torque detector that detects disturbance torques applied to joint shafts included in a multi-axis robot;
  a torque grouping circuit that groups the disturbance torques according to a content of an operation executed by the multi-axis robot upon detection of each disturbance torque;
  a torque correction circuit that obtains a plurality of corrected disturbance torques standardized between a plurality of operations with different contents based on a representative value and an amount of change preliminarily set for each grouped disturbance torque and the disturbance torque detected by the torque detector for each of the grouped disturbance torques; and
  a failure diagnostic circuit that performs a failure diagnosis on the multi-axis robot by comparing each of the corrected disturbance torques with a common threshold,
  wherein the torque correction circuit standardizes each disturbance torque based on the representative value and the amount of change preliminarily set for each grouped disturbance torque.

10. A failure diagnostic device according to claim 9, wherein the representative value and the amount of change preliminarily set for each grouped disturbance torque is calculated by the disturbance torques detected during the operation executed from the multi-axis robot for each grouped disturbance torque.

11. The failure diagnostic device according to claim 9, wherein the torque correction circuit standardizes each disturbance torque by subtracting the representative value from the disturbance torque, and dividing a result of the subtraction by the amount of change of the disturbance torque.

* * * * *